UNITED STATES PATENT OFFICE.

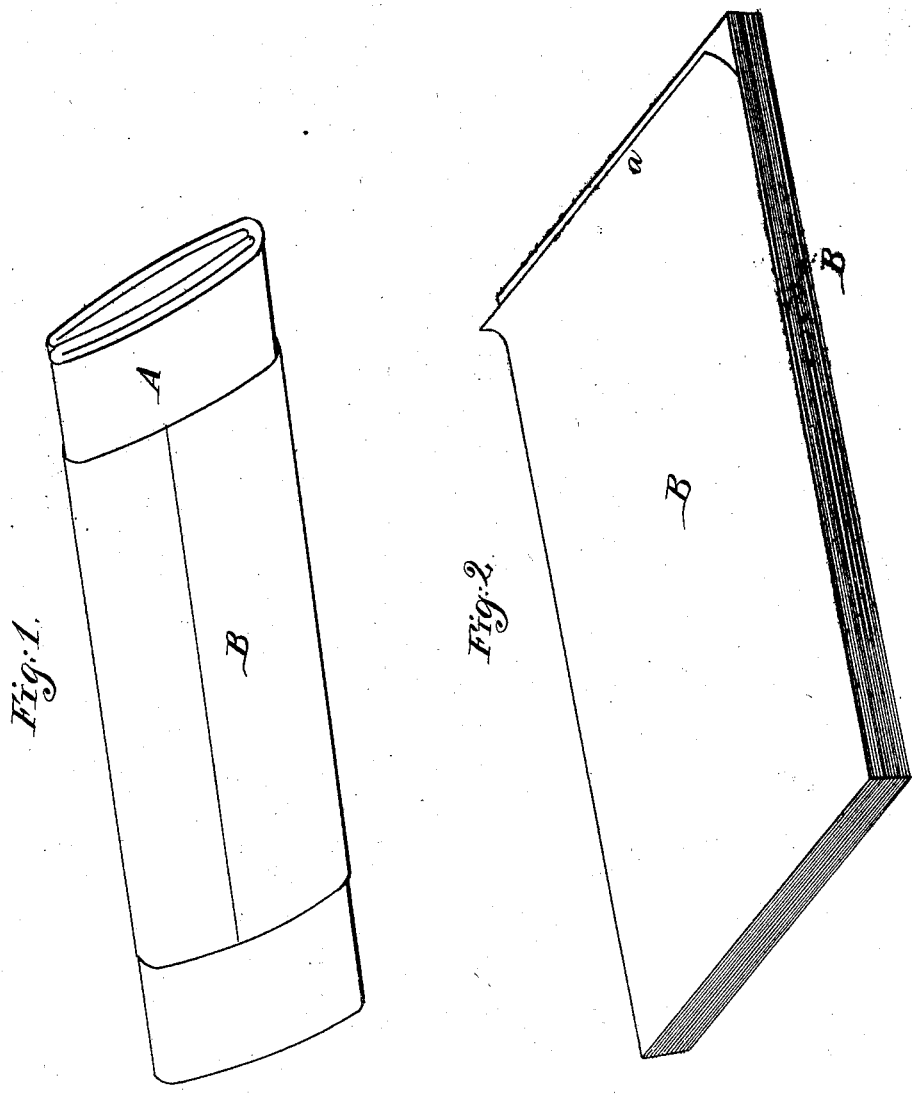

L. P. MARA, OF NEW YORK, N. Y., ASSIGNOR TO JOHN B. MURRAY, OF SAME PLACE.

NEWSPAPER-WRAPPER.

Specification of Letters Patent No. 31,516, dated February 19, 1861.

*To all whom it may concern:*

Be it known that I, L. P. MARA, of the city, county, and State of New York, have invented a new and useful Improvement in Newspaper-Wrappers; and I do hereby declare that the following is a full, clear, and exact description thereof, reference being had to the accompanying drawings, forming a part of this specification, and to the letters of reference thereon.

My said invention relates to postal wrappers such as are used in the transmission of newspapers, periodicals, &c., by mail, and consists in an improvement whereby much time is saved in the despatch of transient papers by individuals who have not the necessary conveniences at hand, for performing the operation of enveloping and sealing the wrapper, possessed by newspaper establishments and others who send large quantities of papers by mail.

My said improvement consists in combining with the ordinary newspaper wrapper a dried marginal coating of gum or mucilage of acacia or other suitable adhesive material that possesses the property of recovering its adhesiveness when moistened so that a newspaper may be readily wrapped and sealed without resort to a gum pot which for almost no other purpose has become a necessary though very inconvenient and unsightly appurtenance to a desk or writing table.

By the use of my improvement self sealing newspaper wrappers may be manufactured and sold ready for immediate use, as are letter envelops, and with the same economy of time, to say nothing of the convenience to persons sending transient newspapers.

The drawings illustrate my invention, Figure 1 being a perspective view of a newspaper enfolded and sealed with the wrapper and Fig. 2 a view of a number of wrappers, B, made ready for immediate use by having a dried marginal coating of gum or mucilage of acacia or other suitable adhesive substance, represented at *a*.

The mode of applying to paper a marginal coating of gum and drying it being well known to stationers and the public I will not describe it as I do not intend to claim any particular way of cutting the paper or applying the gum by hand or machinery.

What I claim as my invention and improvement in newspaper wrappers is,—

Combining with a newspaper wrapper a dried marginal coating of gum acacia or other suitable adhesive material substantially as described.

LAUCE. P. MARA.

Witnesses:
WM. FUSCH.
J. W. COOMBS.